United States Patent [19]

Iwao

[11] Patent Number: 4,916,481
[45] Date of Patent: Apr. 10, 1990

[54] COPYING APPARATUS WITH ORIGINAL DOCUMENT POSITIONING AND GUIDING ARRANGEMENT

[75] Inventor: Soichi Iwao, Osaka, Japan

[73] Assignee: Minolta Camera Kabushiki Kaisha, Osaka, Japan

[21] Appl. No.: 169,615

[22] Filed: Mar. 17, 1988

[30] Foreign Application Priority Data

Mar. 18, 1987 [JP] Japan .................................. 62-63397

[51] Int. Cl.$^4$ ...................... G03B 27/62; G03G 21/00
[52] U.S. Cl. .................................... 355/75; 271/245; 355/230
[58] Field of Search ............... 355/35 H, 75, 230, 231; 271/245

[56] References Cited

U.S. PATENT DOCUMENTS

| 3,863,912 | 2/1975 | Korff | 271/245 |
| 4,183,519 | 1/1980 | Harris | 271/245 |
| 4,469,436 | 9/1984 | Jones et al. | 355/75 X |
| 4,589,768 | 5/1986 | Iwata et al. | 355/75 X |
| 4,629,315 | 12/1986 | Bruggers | 355/75 |

FOREIGN PATENT DOCUMENTS 59-207345 11/1984 Japan .................................. 271/245
60-260030 12/1985 Japan .

Primary Examiner—Fred L. Braun
Attorney, Agent, or Firm—Burns, Doane, Swecker & Mathis

[57] ABSTRACT

A copying apparatus which includes an original document platform, an original document transport device, an engaging/guiding member having an engaging face at its portion confronting one side edge face of an original document platform, a holding device for holding the engaging/guiding member so that the engaging face is movable upward and downward, and backward and forward, a first driving section for displacing the engaging/guiding member backward and forward, a second driving section for displacing the engaging/guiding member upward and downward, and a control device for controlling the first and second driving sections in such steps as to cause the engaging/guiding member to retreat backward, to move upward or downward, and to advance forward.

6 Claims, 6 Drawing Sheets

COPYING APPARATUS WITH ORIGINAL DOCUMENT POSITIONING AND GUIDING ARRANGEMENT

BACKGROUND OF THE INVENTION

The present invention generally relates to a positioning and guiding arrangement, and more particularly, to an original document positioning and guiding arrangement applicable to a copying apparatus provided with an automatic document feeder and the like.

Conventionally, there has been disclosed, for example, in Japanese Patent Laid-Open Publication Tokkaisho No. 60-260030, a prior art so arranged that there is so provided an exit gate for positioning the original document at a predetermined position on an original document platform, and this exit gate normally held at a position not obstructing transport of the original document is shifted by a driving means such as a solenoid and the like, to a position for stopping the original document when the original document is started to be transported onto the original document platform.

In the case of the original document transport arrangement as disclosed in the embodiment of the above prior art, however, a gap is provided between the original document positioning member (i.e., the exit gate) and the original document platform, and there are cases where the leading edge of the original document enters such a gap when the original document positioning member (i.e., the exit gate) positions the original document at a predetermined position or said member guides the original document for the discharge thereof, thus resulting in damages to the original document or jamming thereof in the arrangement. If it is intended to eliminate the gap between the original document positioning member (i.e., the exit gate) and the original document platform, there is such a problem that said original document positioning member (i.e., the exit gate) does not function smoothly.

SUMMARY OF THE INVENTION

Accordingly, an essential object of the present invention is to provide a copying apparatus and the like provided with an original document positioning and guiding arrangement which is capable of positively stopping the original document at a predetermined position for copying, and smoothly carrying out the original document after the copying operation.

Another important object of the present invention is to provide the original document positioning and guiding arrangement of the above described type, which is simple in construction and stable in functioning, and can be readily incorporated into a copying apparatus and the like at low cost.

In accomplishing these and other objects, according to one preferred embodiment of the present invention, there is provided a copying apparatus provided with an original document positioning and guiding arrangement which includes an original document platform, an original document transport means, an engaging/guiding member having an engaging face at its portion confronting one side edge face of an original document platform, a holding means for holding said engaging/guiding member so that said engaging face is movable upward and downward, and backward and forward, a first driving means for displacing said engaging/guiding member backward and forward, a second driving means for displacing said engaging/guiding member upward and downward, and a control means for controlling said first and second driving means in such steps as to cause said engaging/guiding member to retreat backward, to move upward or downward, and to advance forward.

More specifically, the original document positioning and guiding arrangement according to the present invention includes an engaging/guiding member provided with an engaging face confronting a side edge face of an original document platform, and having functions to stop and guide an original document, base portions for movably holding said engaging/guiding member for relative displacement, a first driving section for driving said engaging/guiding member in directions to contact or to be spaced away from the side edge face of said original document platform, and a second driving section for driving said engaging/guiding member so as to be raised above or lowered below the original document placing surface of said original document platform.

In the original document positioning and guiding arrangement of the present invention as described above, under the steady state, the engaging/guiding member is raised, at least in its portion including the engaging face thereof, above the original document placing surface of the original document platform, and said portion is held at the position contacting the side edge face of the original document platform by the urging action of spring means, whereby the original document transported is stopped at the engaging face of the engaging/guiding member, and after being positioned at a predetermined position on the platform, subjected to the copying function. Upon completion of the copying function, the engaging/guiding member is driven by the first driving section against the urging force of the spring means so as to be spaced from the side edge face of the original document platform, and thus, a gap is formed between the side edge face of the original document platform and the engaging face of the engaging/guiding member. At a predetermined timing with respect to the above function, the engaging/guiding member is depressed downward through driving by the second driving section 7 for pivotal movement about its support shaft in a counter-clockwise direction, and the portion of said member including at least said engaging face is lowered below the original document placing surface of the platform. Subsequently, the engaging/guiding member is brought into contact, at its engaging face, with the side edge face of the original document platform by the turning off of the first driving section, and thus, the gap between the side edge face of the original document platform and the engaging face of the engaging/guiding member is eliminated. Moreover, since at least the engaging face of the engaging/guiding member is lowered below the original document placing surface, the original document becomes displaceable beyond the original document platform and is carried out of the original document platform through guiding by the engaging/guiding member. Thereafter, in preparation for a next copying cycle, the engaging/guiding member is driven by the first driving section to be spaced away from the side edge face of the original document platform. Subsequently, since the second driving section is turned off to release its depressing force, the engaging/guiding member is pivoted about its support shaft in the clockwise direction by the restoring force of the spring means so as to be raised above the original document placing surface. Then, upon turning off of the first driving section, the engaging/driving member is displaced by the urging force of the spring so that its engaging face contacts the side edge face of the original document platform. In this case, the amount of rising of the engaging/guiding member is restricted by a projection provided on one of the base portions for supporting the engaging/guiding member, and said engaging/guiding member is again displaced to the predetermined position for stopping the original document.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
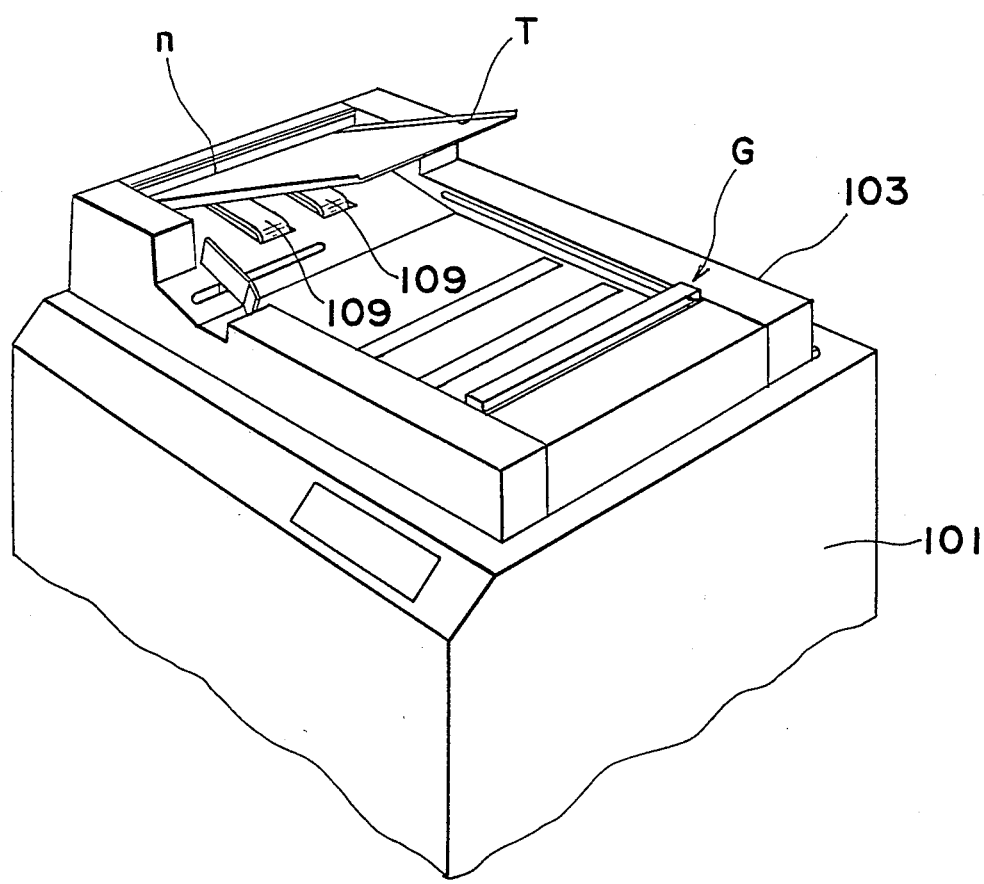
FIG. 1 is a fragmentary perspective view of a copying apparatus to which an original document positioning and guiding arrangement according to the present invention may be applied.

Before the description of the present invention proceeds, it is to be noted that like parts are designated by like reference numerals throughout the accompanying drawings.

Figure 2:
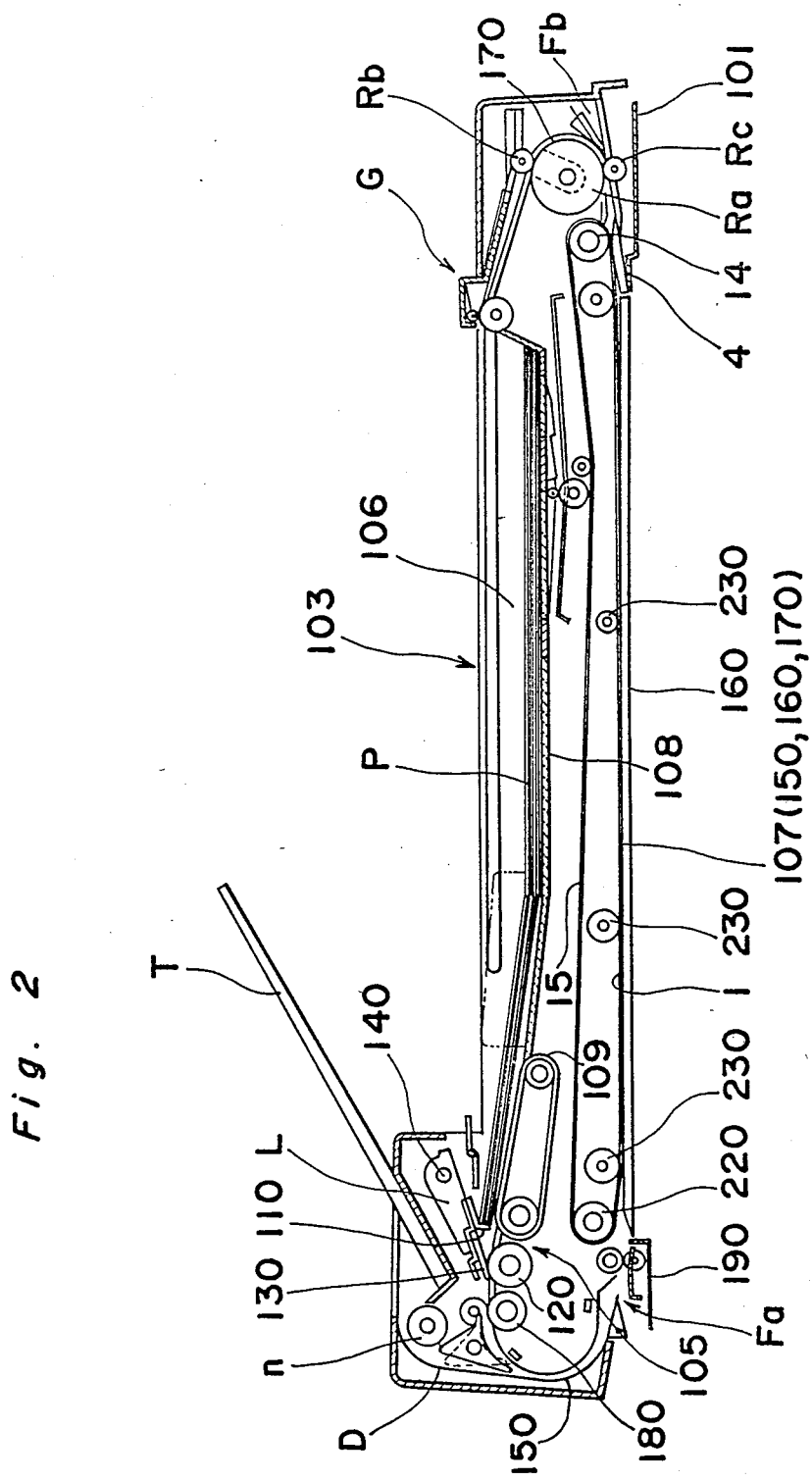
FIG. 2 is a side sectional view, on an enlarged scale, of a circulation type automatic document feeder for the copying apparatus of FIG. 1 provided with the original document positioning and guiding arrangement of the present invention.

Referring now to the drawings, there is shown in FIG. 1 a copying apparatus including a circulation type document feeder to which an original document positioning and guiding arrangement of the present invention may be applied, while FIG. 2 shows a side sectional view of the document feeder of FIG. 1.

As shown in FIGS. 1 and 2, in a casing 103 covering an original document platform 1 on the upper surface of a copying apparatus main body 101, there are provided an original document storing section 106 arranged to accommodate a stack of original documents P therein and to send out the original documents P one sheet by one sheet, through a sheet feeding means 105, and a circulating transport path 107 which feeds the original document P delivered from the original document storing section 106 onto the original document platform 1, and also, to return the same from the original document platform 1 back to the original document storing section 106.

The original document storing section 106 is formed on the upper surface of the casing 103 as a recessed portion as shown in FIG. 2, and capable of storing a predetermined number of original documents P in a stack. The sheet feeding means 105 includes delivery belts 109 provided at the forward end of a bottom plate 108 of the original document storing section 106 from below so as to be generally flush with said forward end, and separating pieces 110 directed over the upper portions of the delivery belt 109 through an original document feeding gap left therebetween.

The sheet feeding means 105 further includes transport rollers 120 located directly behind the delivery belts 109 and separating pads 130 contacting the upper portions of the rollers 120 under pressure. The separating pieces 110 and separating pads 130 are mounted on a lever L pivotally supported at its base by a shaft 140, and the lever L is stabilized by causing the pads 130 to contact the rollers 120 under pressure by downward movement due to its weight about the shaft 140 and through urging by a pressure spring (not shown), thereby to direct the separating pieces 110 at a predetermined height above the delivery belts 109.

The circulating transport path 107 is a continuation of a curved transport path 150 at the feeding side for leading the original document P fed from the sheet feeding means 105 onto the original document platform 1, a straight transport path 160 to be formed with respect to the original document platform 1, and a curved transport path 170 provided at the returning side for returning the original document P on the original document platform 1 back to the original document storing section 106 from its rear end side. The curved transport path 150 at the feeding side is provided, at its starting end, with a take-out roller 180, and at its trailing end, with a pair of pinch rollers 190. The take-out roller 180 is adapted to receive the original document P fed from the sheet feeding means 105 to the curved transport path 150, and thereafter, to take out the original document from the sheet feeding means 105 for further feeding thereof into the curved transport path 150.

The straight transport path 160 is formed by the original document platform 1 and a transport belt 15 provided to contact under pressure, the surface of the platform 1. The transport belt 15 in the form of an endless belt is movably supported below the bottom plate 108 of the original document storing section 106 by a driving roller 14 and a driven roller 220, and adapted to contact under pressure, the original document platform 1 at the intermediate portion of the belt 15 through guide rollers 230, whereby the transport belt 15 receives the original documents P fed from the curved transport path 150, onto the original document platform 1, and also feeds the original document P received on the platform 1, into the curved transport path 170 at the returning side.

At a position spaced from the original document platform 1 toward the returning side in the straight transport path 160, there is provided an engaging/guiding member 4 directly related to the present invention and to be described in detail hereinafter.

The curved transport path 170 at the returning side has a large-diameter transport roller Ra, and driven rollers Rb and Rc are held in pressure contact with the upper and lower portions on the peripheral surface of said transport roller Ra, whereby the original document P fed from the original document platform 1 into the curved transport path 170 is transported as it is curved along the peripheral surface of the roller Ra so as to be returned to the original document storing section 106 from its trailing end.

At the rear end portion of the original document storing section 106, a rear end guide G is provided to guide the trailing end of the original document P for feeding the original document into the separating pieces 110.

At the upper forward end side of the casing 103, a tray T for original document discharge is disposed slantwise so as to discharge the original documents onto the tray T through an original document discharge path D branched upwardly from the curved transport path 150. Such discharge is effected by moving the transport belt 15 in the opposite direction and rotating the pinch rollers 190 in the reverse direction, with driving of a discharge roller n. Immediately before the pinch rollers 190 for the transport path 150, a feeding/discharge port Fa is provided, while directly after the delivery portion of the transport roller Ra and driven roller Rb of the curved transport path 170, another feeding/discharge port Fb is provided.

Since other constructions and functions of the automatic document feeder of FIGS. 1 and 2 explained so far are described in detail in U.S. patent application Ser. No. 122,124, filed on Nov. 17, 1987, now U.S. Pat. No. 4,786,039, and assigned to the same assignee as the present invention, reference should be made thereto for further details thereof.

Figure 3:
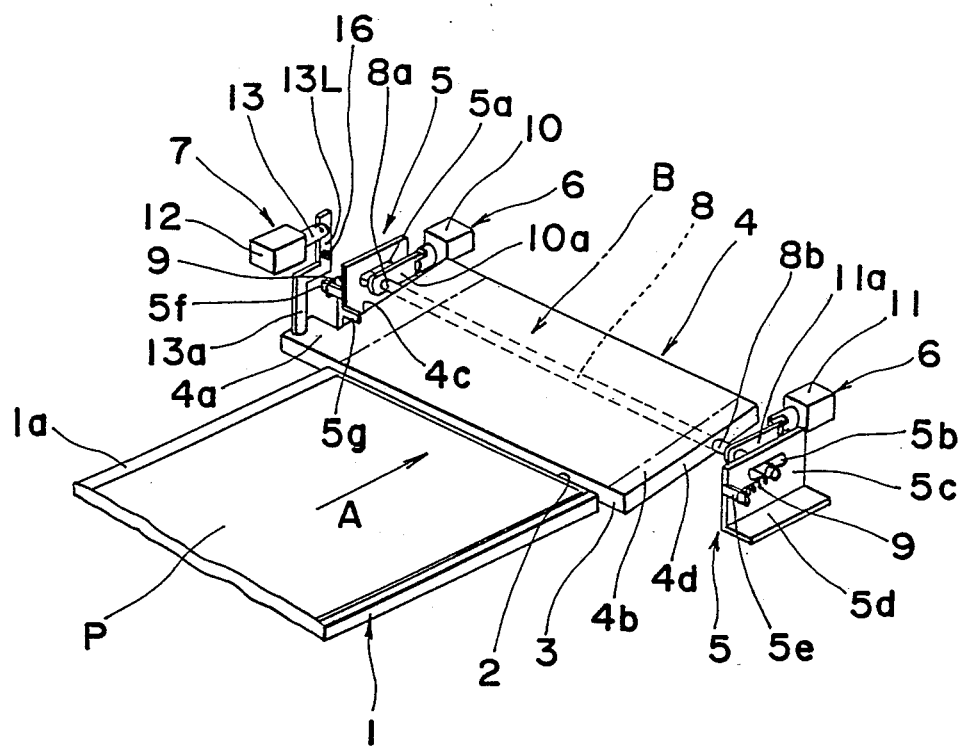
FIG. 3 is a fragmentary perspective view showing an essential portion of the original document positioning and guiding arrangement employed in the copying apparatus of FIG. 1.

Referring further to FIG. 3, there is shown an original document positioning and guiding arrangement according to the present invention which is provided at the lower right end portion in the automatic document feeder described in FIGS. 1 and 2.

The original document positioning and guiding arrangement in FIG. 3 generally includes the engaging/guiding member 4 referred to earlier and having an engaging face 3 confronting a side edge face 2 of the original document platform 1 onto which the original document P is carried in or from which such original document P is carried out, holding means or base portions 5 provided at opposite sides of the engaging/guiding member 4 for supporting said member 4, and a first driving section 6 and a second driving section 7 for driving said engaging/guiding member 4 in a manner to be described later.

The engaging/guiding member 4 in a rectangular plate-like configuration has its engaging face 3 wider in width than the confronting side edge face 2 of the original document platform 1. In other words, the engaging/guiding member 4 has projecting portions 4a and 4b extending outwardly from a transport region B of the original document P transported over the platform 1 in the direction indicated by an arrow A. The engaging/guiding portion 4 is provided with a rotary shaft 8 disposed in a direction intersecting at right angles with the transport direction A of the original document P, and this rotary shaft 8 has shaft portions 8a and 8b projecting towards the opposite sides of said engaging/guiding member 4. Meanwhile, the base portions 5, each in an L-shaped cross section, include vertical portions 5c formed with elongated openings 5a and 5 which have long axes thereof directed generally parallel to the transport direction A of the original document P, and through which the shaft portions 8a and 8b of the rotary shaft 8 are extended, and flat bases 5d fixed to the copying apparatus main body 101 (FIG. 1). Thus, the engaging/guiding member 4 is pivotally supported by the base portions 5 through engagement between the shaft portions 8a and 8b of the rotary shaft 8 and the elongated openings 5a and 5b. Moreover, the base portions 5 are provided with folded portions 5f and 5e at left side edges of the vertical portions 5c in FIG. 3, and springs or urging members 9 are respectively connected between the folded portion 5e and the shaft portion 8b, and between the folded portion 5f and the shaft portion 8a, whereby the engaging/guiding member 4 is normally urged leftward in FIG. 3 in a direction towards the original document platform 1.

Moreover, on the portions of the shaft portions 8a and 8b held between the vertical portions 5c of the base portions 5 and the opposite end faces 4c and 4d of the engaging/guiding member 4 respectively, there are fitted forward ends of plungers 10a and 11a, which are respectively connected to solenoids 10 and 11 mounted on the copying apparatus main body 101 as a first driving section 6 for driving the engaging/guiding member 4 in a direction to contact the side edge face 2 of the original document platform 1 or to be spaced away therefrom.

Furthermore, in a position confronting the projecting edge portion 4a of the engaging/guiding member 4 referred to earlier, there is engageably provided a folded end portion 13a of a lever 13L pivotally connected to a plunger 13 to be actuated by a solenoid 12 mounted on the copying apparatus main body 101 as the second driving section 7 for causing the engaging/guiding member 4 to be raised above or lowered below the original document placing surface 1a of the platform 1. Moreover, on the base portion 5 provided at the side of said solenoid 12, there is further provided a projection 5g besides the folded portion 5f. This projection 5g has a function as a stopper for restricting the amount of rising of the engaging/guiding member 4. The lever 13L of the plunger 13 for the solenoid 12 is arranged to be rotatable about a support shaft 16, and during functioning of the solenoid 12, depresses the projecting edge portion 4a downwardly at its forward end portion 13a.

It is to be noted here that in FIG. 3, the components for the automatic document feeder as shown in FIG. 2 are abbreviated for clarity.

Referring also to FIGS. 4(a) to 4(c) and FIG. 5, functionings of the original document positioning and guiding arrangement having the construction as described so far will be explained hereinafter.

Figure 4A:
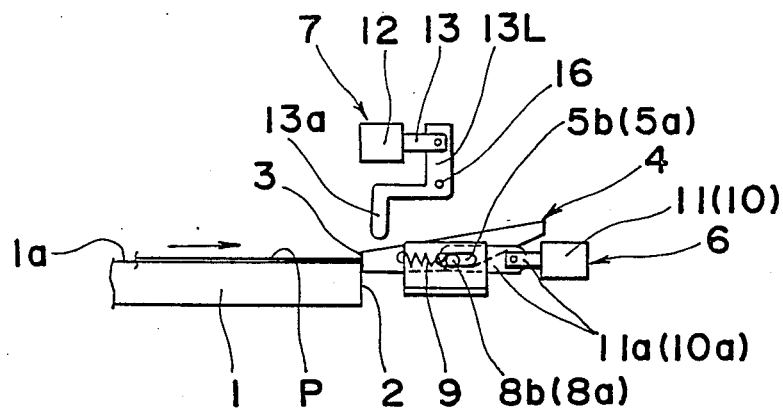
FIGS. 4(a), 4(b), 4(c) and 4(d) are side elevational views of the arrangement of FIG. 3 for explaining functionings thereof.

In FIG. 4(a), there is schematically shown the state where the engaging face 3 of the engaging/guiding member 4 stops the original document P for positioning of said original document.

The shaft portions 8a and 8b of the rotary shaft 8 are urged in the leftward direction by the springs 9 in FIG. 4(a), whereby the entire engaging/guiding member 4 is biased towards the left. Thus, the engaging face 3 of the engaging/guiding member 4 contacts under pressure the side edge face 2 of the original document platform 1, with part of said engaging face 3 being raised above the side edge face 2 up to a position where the projection 5g of the base portion 5 contacts the upper surface of said member 4 (FIG. 3). In other words, in the above state, there is no gap between the engaging face of the engaging/guiding member 4 and the side edge face 2 of the original document platform 1. At this time, the upper surface of the engaging/guiding member 4 takes an attitude or posture in which it is inclined by a predetermined amount downwardly toward the left side. Meanwhile, the first driving section 6 and the second driving section 7 are both in the off state in FIG. 4(a).

In the state of FIG. 4(a) in which the engaging face 3 is held in contact with the side edge face 2, and also raised above the original document placing surface 1a to the predetermined extent, when the original document P comes transported by the roller 14 and transport belt 15, etc., with its image surface directed downward, in the rightward direction over the platform 1, the leading edge of the original document P contacts the engaging face 3 of the engaging/guiding member 4 so as to be stopped thereat, and the copying operation of the original document P is effected at this stopped position.

Figure 4B:
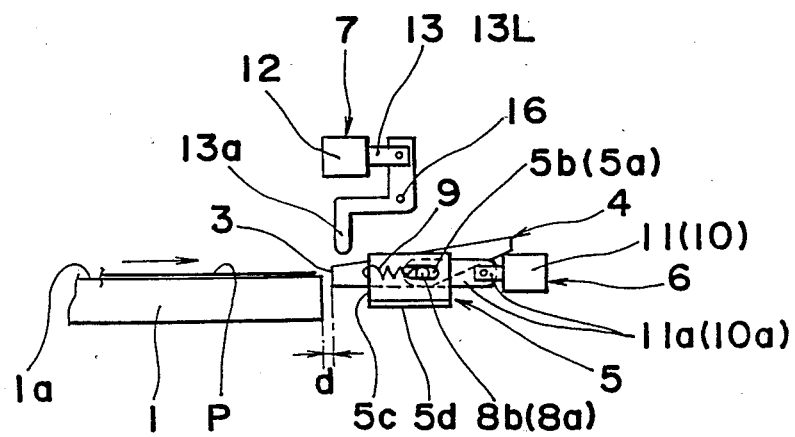

Upon completion of the copying function, the solenoids 10 and 11 as the first driving section 6 are actuated, whereby as shown in FIG. 4(b), the shaft portions 8a and 8b of the rotary shaft 8 for the engaging/guiding member 4 (FIG. 3) are slid rightward within the elongated openings 5a and 5b against the action of the springs 9. In other words, the entire engaging/guiding member 4 is displaced in the direction to be spaced away from the side edge face 2 of the original document platform 1, and thus, a predetermined gap d is formed between the engaging face 3 of the member 4 and the side edge face 2 of the platform 1.

Subsequently, since the solenoid 12 as the second driving section 7 is actuated to attract the plunger 13 towards said solenoid 12, the lever 13L of the plunger 13 is pivoted counterclockwise about the support shaft 16 thereof, and the forward end 13a of the lever 13L is brought into contact with the projecting edge 4a of the engaging/guiding member 4, thereby to depress said member 4 down to the position shown in FIG. 4(c) for lowering the engaging face 3 of the engaging/guiding member 4 below the surface 1a of the original document platform 1 by a predetermined extent.

Figure 4C:
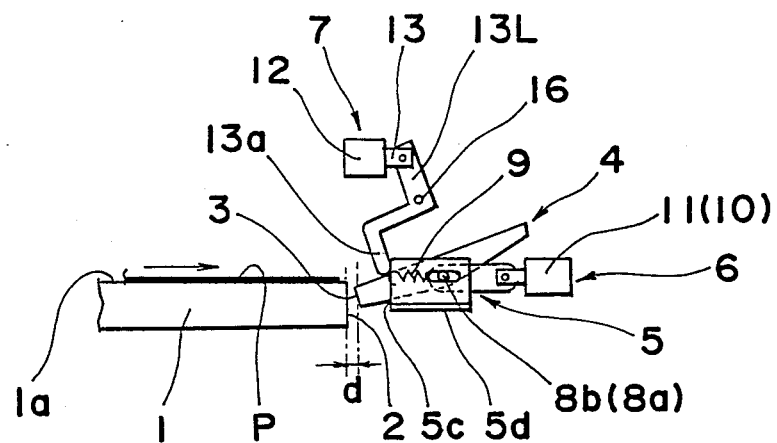

In the state as shown in FIG. 4(c), each of the solenoids 10, 11 and 12 is in the ON state, with said gap d being maintained between the engaging face 3 of the member 4 and the side edge face 2 of the platform 1.

Figure 4D:
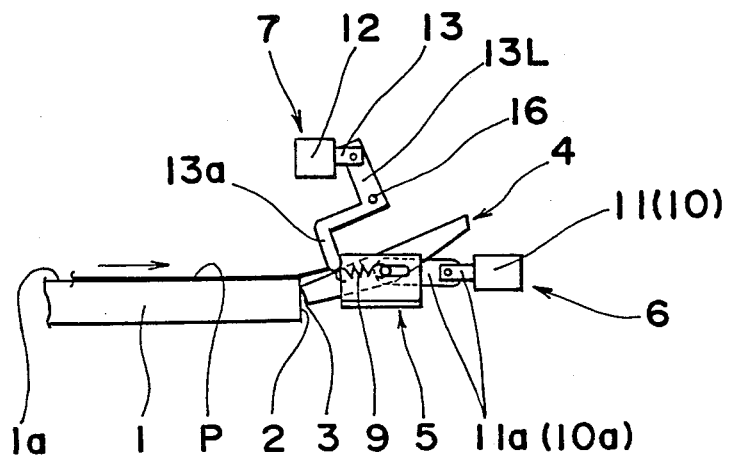

Thereafter, the solenoids 10 and 11 are released from functioning and the plungers 10a and 11a are shifted leftward. Therefore, the shaft portions 8a and 8b of the rotary shaft 8 for the engaging/guiding member 4 are also slid for displacement leftward within the elongated openings 5a and 5b, and by the action of the springs 9, the engaging face 3 of the engaging/guiding member 4 and the side edge face 2 of the original document platform 1 are brought into contact with each other to establish the state as shown in FIG. 4(d).

Meanwhile, since the solenoid 12 is maintained in the ON state, the engaging/guide member 4 remains to be depressed at its left end by the forward end 13a of the lever 13L for the plunger 13.

Accordingly, the original document P stopped by the engaging face 3 on the original document platform 1 becomes movable out of said platform 1, and is transported rightward in the carrying out direction through guiding by the upper surface of the engaging/guiding member 4.

Figure 5:
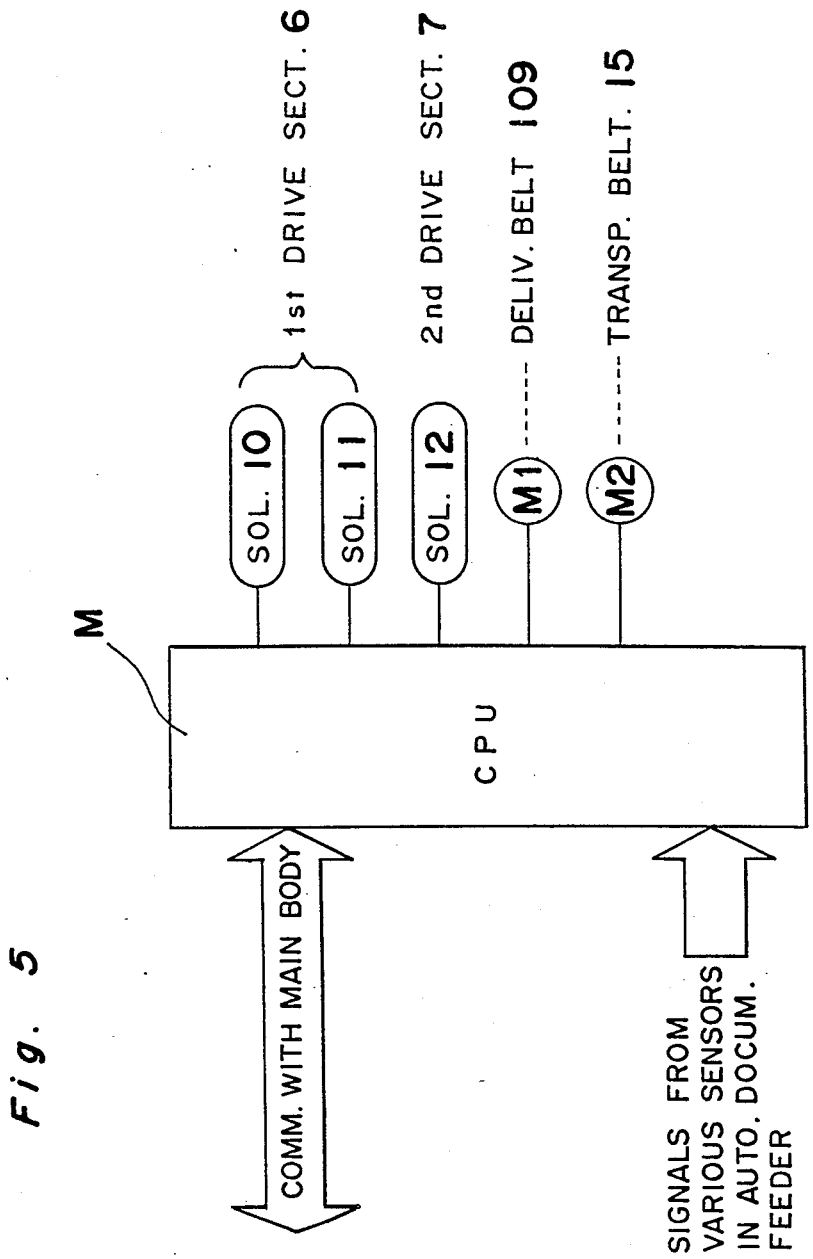
FIG. 5 is a block diagram for explaining functioning of a control means for the arrangement of FIG. 3.

It is to be noted here that, as shown in FIG. 5, the solenoids 10 and 11 for the first driving section 6, solenoid 12 for the second driving section 7, and motors M1 and M2 for the delivery belts 109 and transport belt 15, etc. are connected for being controlled, to a CPU M for communication with the copying apparatus main body, and receiving various signals from sensors in the automatic document feeder as shown in FIG. 2.

After the foregoing function is effected, for returning again to the original document stopped state in FIG. 3 from the state of FIG. 4(d) in which the original document P is movably set on the engaging/guiding member 4, the arrangement is set in the procedures as described hereinbelow.

In the first place, from the state as shown in FIG. 4(d), the solenoids 10 and 11 are turned on so as to space the engaging face 3 of the engaging/guiding member 4 away from the side edge face 2 of the original document platform 1 (FIG. 4(d)).

Subsequently, the solenoid 12 is released, whereby the lever 13L of the plunger 13 is disengaged from the projecting edge 4a of the engaging/guiding member 4, and said member 4 is rotated clockwise about the rotary shaft 8 up to the state of FIG. 4(b).

Then, upon turning off the solenoids 10 and 11, the engaging/guiding member 4 is displaced leftward by the action of the springs 9, and the engaging face 3 of the member 4 contacts the side edge face 2 of the platform 1 under pressure, with the engaging face 3 partly raised above the original document placing surface 1a so as to stop the original document P thereby (FIG. 4(a)). When the original document P is transported onto the original document placing surface 1a, such original document P is stopped at the predetermined copying position by the engaging face 3.

It is to be noted here that displacement from the state of FIG. 4(a) to that of FIG. 4(d) or, on the contrary, from the state of FIG. 4(d) to that of FIG. 4(a), is effected through control of the first driving section 6 and the second driving section 7 by the control section, for example, as shown in FIG. 5 referred to earlier.

As is clear from the foregoing description, according to the original document positioning and guiding arrangement of the present invention, in the case where the original document is to be positioned at the predetermined position for copying, the original document can be positively stopped by the pressure contact of the engaging face of the engaging/guiding member with the side edge face of the original document platform, with said engaging face being raised above the original document placing surface by a predetermined extent. Meanwhile, when the original document is to be discharged out of the original document platform after the copying, the engaging face of the engaging/guiding member contacts the side edge face of the original document platform under pressure in the state where said engaging face is lowered below the surface of the platform without forming any gap, and therefore, the leading edge of the original document is guided by the engaging/guiding member without falling into the gap. Accordingly, in the case where the original document is discharged from the original document platform, there is no possibility that the leading edge of the original document is undesirably folded by entering a gap between the original document platform and the feeding members, etc., and thus, a remarkably favorable effect may be achieved in the actual applications by the present invention.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:
1. A copying apparatus which comprises:
an original document platform having a document surface,
original document transport means,
an engaging/guiding member movable between a first position wherein a face thereof contacts one side edge of the original document platform and a second position for guiding an original document, holding means for holding said engaging/guiding member so that said face is movable upward and downward, and backward and forward, first driving means for displacing said engaging/guiding member backward and forward, second driving means for displacing said engaging/guiding member upward and downward, and control means for controlling said first and second driving means in such steps as to cause said engaging/guiding member to selectively engage and guide the original document whereby the engaging/guiding member is caused first, to retract from the one side of the original document platform, then to move back and forth between the first position wherein a portion of the face projects above the one side edge so as to engage the original document and the second position wherein all of the face is displaced below the document surface of the original document platform so as to allow the original document to pass over the engaging/guiding member, and finally to advance until it contacts the one side edge.

2. A copying apparatus as claimed in claim 1, wherein said engaging/guiding member is adapted to be displaced upward or downward through pivotal movement thereof about a shaft.

3. An original document positioning/guiding arrangement which comprises:

engaging/guiding means provided with an engaging face confronting a side edge face of an original document platform, and for engaging and guiding an original document, base portions for movably holding said engaging/guiding member for relative displacement, first driving means for driving said engaging/guiding means in a direction to contact or to be spaced away from the side edge face of said original document platform, second driving means for rotating said engaging/guiding means so that the engaging face is raised above or lowered below an original document placing surface of said original document platform, and control means for controlling said first and second driving means in such steps as to cause said engaging/guiding means to engage and guide the original document whereby the engaging guiding means is caused first, to retract from the side edge face of the original document platform, second, to rotate so that the engaging face of the engaging/guiding means is in a position below the original document placing surface of the original document platform, third, while the engaging guiding means is still in a rotated position, to translate back to where a top portion of the engaging face of the engaging guiding means contacts the side edge face of the original document platform, fourth, to retract from the side edge of the original document platform, fifth, to rotate so that a top portion of the engaging face of the engaging/guiding means is above the original document placing surface of the original document platform, and sixth, to translate back until a bottom portion of the engaging face of the engaging/guiding means contacts the side edge face of the original document platform while the top portion of the engaging face of the engaging/guiding means is above the original document placing surface of the original document platform.

4. A copying apparatus arranged to position and guide an original document over a copier platen which comprises:

an original document platform, an original document transport means, an engaging/guiding member having an end face at a position confronting a side edge of the original document platform, and a top surface for guiding the original document, a support member for movably supporting said engaging/guiding member so that the end face of the engaging/guiding member is moveable between a first position projecting from and making contact with a side edge of the original document platform in order to stop an original document transported by the original document transport means over the original document platform, and a second position below and making contact with the side edge of the original document platform in order to guide said original document over the original document platform, and a third position separated from the side edge of the original document platform by a certain minimum distance and, an urging member for urging the end face of said engaging/guiding member into contact with the side edge of the original document platform, first driving means for displacing the engaging/guiding member in such a manner that the end face of said engaging/guiding member moves up and down along the side edge of said original document platform, second driving means for horizontally displacing said engaging/guiding member in such a manner as to displace the end face of the engaging/guiding member away from the side edge of the original document platform against said urging force, and controlling means for controlling said first and second driving means in such steps as to cause said engaging/guiding member to selectively engage and guide the original document whereby said engaging/guiding member is caused first, to retract from the side edge of the original document holder and then to move back and forth between the first, second, and third positions.

5. A copying apparatus as claimed in claim 4, wherein said first driving means includes a solenoid attached to the copying apparatus body, and a rotatable lever connected at its one end to said solenoid and at its other end to said engaging/guiding member.

6. A copying apparatus as claimed in claim 4, wherein said second driving means includes a solenoid attached to the copying apparatus body, and a rotatable lever connected at its one end to said solenoid, and at its other end, to said engaging/guiding member.

* * * * *